Figure 1:
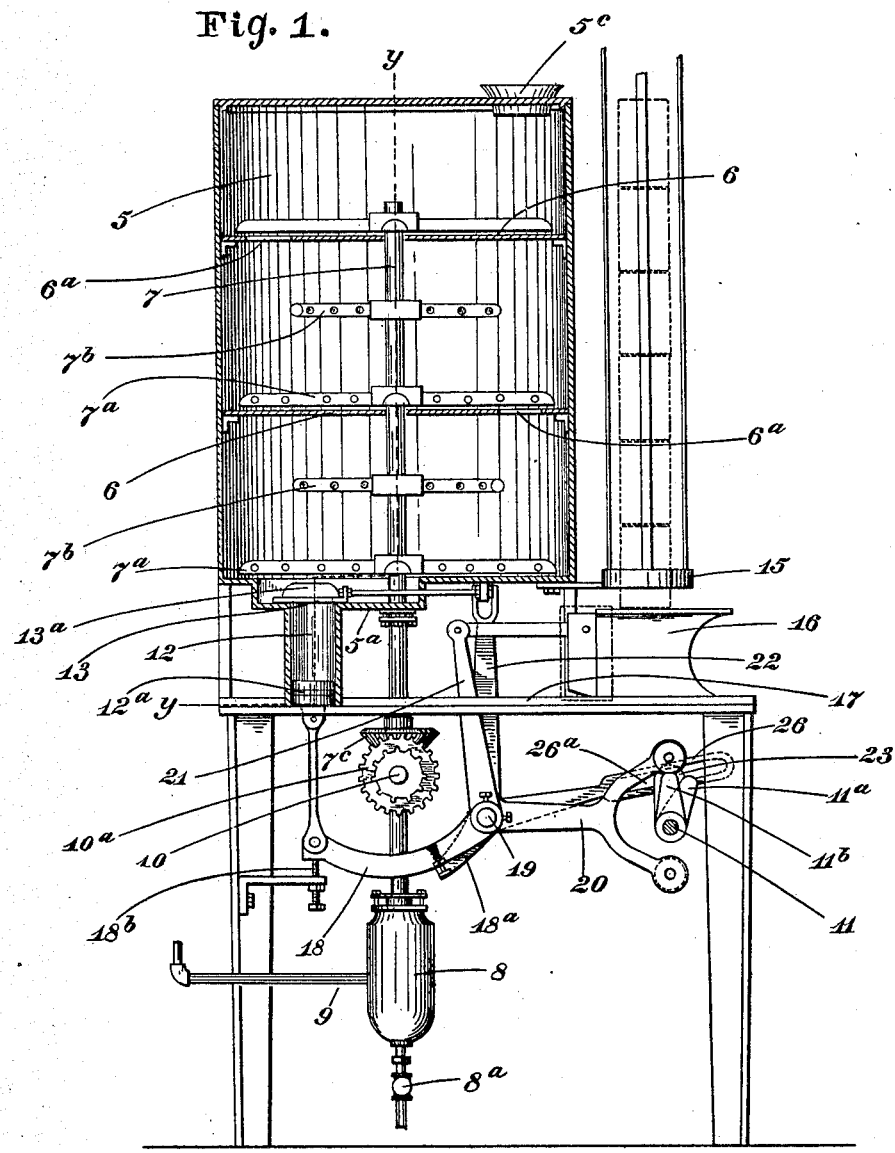

No. 860,313. PATENTED JULY 16, 1907.
S. E. MORRAL.
CAN FILLING MACHINE.
APPLICATION FILED NOV. 21, 1905.

2 SHEETS—SHEET 1.

Witnesses
Benj. Finckel
Alice B Cook.

Inventor
Samuel E. Morral
by Finckel & Finckel
his Attorneys

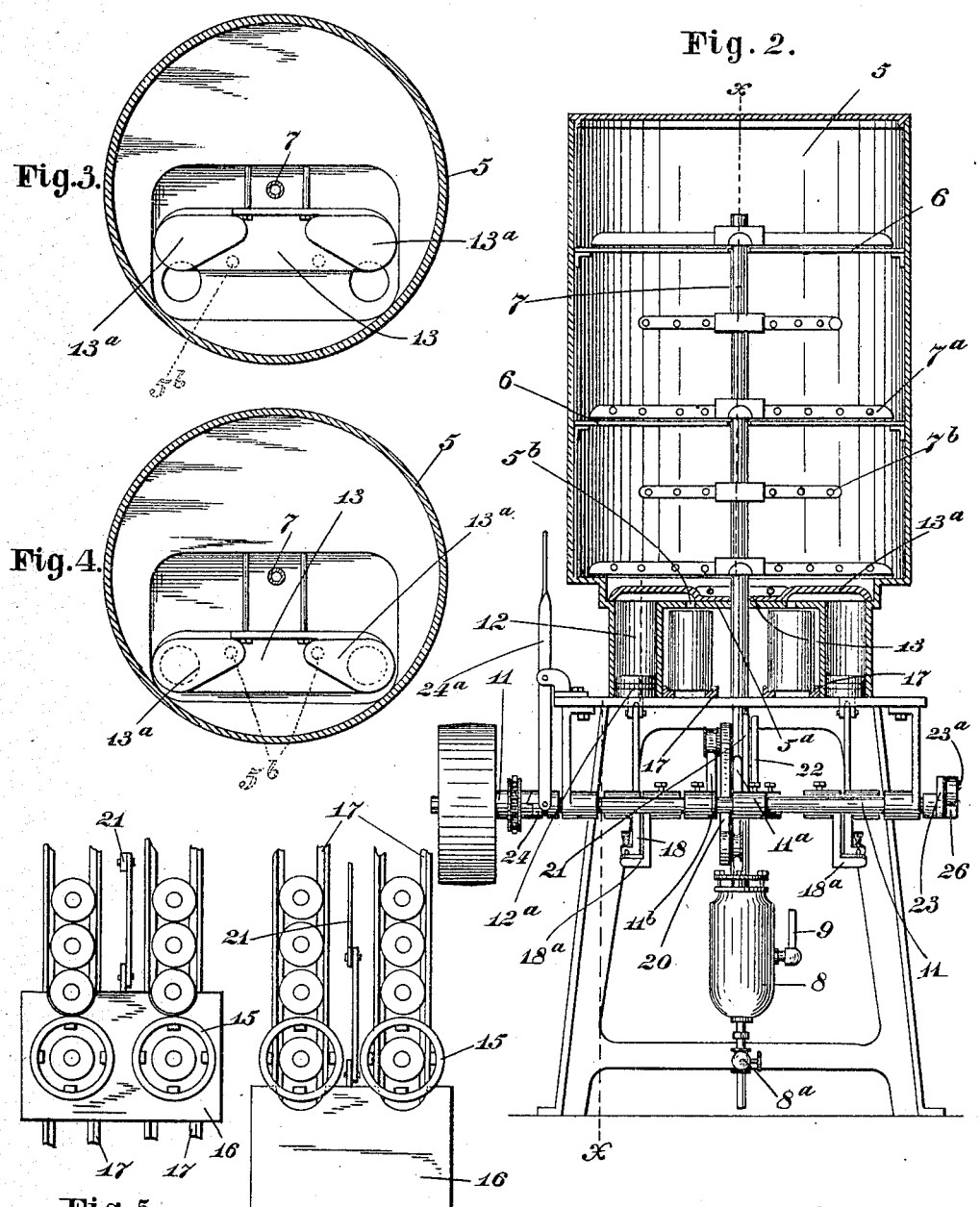

UNITED STATES PATENT OFFICE.

SAMUEL E. MORRAL, OF MORRAL, OHIO, ASSIGNOR OF ONE-HALF TO WILLIAM W. MORRAL, OF MORRAL, OHIO.

CAN-FILLING MACHINE.

No. 860,313.  Specification of Letters Patent.  Patented July 16, 1907.

Application filed November 21, 1905. Serial No. 288,451.

*To all whom it may concern:*

Be it known that I, SAMUEL E. MORRAL, a citizen of the United States, residing at Morral, in the county of Marion and State of Ohio, have invented certain new and useful Improvements in Can-Filling Machines; and I do hereby declare the following to be a full, clear, and exact description of the invention, such as will enable others skilled in the art to which it appertains to make and use the same.
The object of this invention is to provide an improved machine especially adapted for filling cans with corn or other vegetables.

The invention consists in the construction hereinafter described and claimed.
In the accompanying drawings in which I illustrate but one embodiment of the invention—Figure 1 is a vertical sectional view taken on the line $x$—$x$ Fig. 2; Fig. 2 is a combined elevational and vertical sectional view the sectional view being through the cooking chamber and on the line $y$—$y$ Fig. 1; Fig. 3 is a top view of the valve that works over the upper end of the can-filling cylinder the valve being in uncovering position; Fig. 4 is a similar view showing the valve in covering position; Fig. 5 shows in plan view a detail of the can-feeding device in the position where it has moved a can from under the can chute toward the can-filling port, and Fig. 6 shows in plan view a detail of the can-filling device in position to move another can from under the can chute.
In the several views 5 designates the cooking chamber which is of cylindrical form and stationarily supported on a suitable frame. This chamber is made with a suitable opening $5^c$ at its upper end through which the material to be cooked and canned is supplied thereto. This chamber is also divided horizontally by partitions 6 having openings $6^a$ for permitting the discharge of the corn or other material to be cooked from a compartment above to that compartment next below. Extending upward from the exterior and through the longitudinal center of the cooking chamber is a steam pipe 7 provided with radial arms $7^a$ and $7^b$ some or all of which can be tubular and attached to communicate with the pipe 7 and perforated to permit the passage of steam therethrough. These radial arms when not perforated subserve the function of stirring the material being cooked and when perforated for the passage of steam they subserve the double function of supplying the cooking agent to the material as well as stirring it.
8 designates a trap to catch water of condensation from steam admitted to the pipe 7. This trap is provided with a discharge valve $8^a$ to draw off accumulated water.

The character 9 designates a pipe through which steam is conducted through the trap 8 to the pipe 7. The pipe 7 preferably has an appropriate ordinary steam-tight swivel connection with the steam trap, not shown but well understood, and it also has secured to it a bevel gear $7^c$ to be engaged by a similar gear $10^a$ on a shaft 10 driven by means of appropriate sprocket and chain connection from the main operating shaft 11.

12 designates a can-filling cylinder which is located below but communicates with the lower end of the cooking chamber, the upper end of the cylinder terminating in a depressed portion $5^a$ of the lower end of said cooking chamber. The cylinder is provided with a reciprocable piston $12^a$. On the upper side of the depressed portion $5^a$ above the upper end of the cylinder slides a valve plate 13 having a raised portion $13^a$ forming a cavity of ovate outline constituting a duct. The larger end of the cavity fits over the upper end of the cylinder, while the smaller end thereof extends beyond the end of the cylinder and over a port $5^b$ that leads to the exterior of the cooking chamber. When communication between the cooking chamber is intercepted communication between the port $5^b$ and the cylinder is established and when the valve is off the opening at the end of the cylinder the flat part of the valve covers the port.

15 designates a can chute down which the cans are conveniently supplied from the floor above.

16 designates a reciprocable can-feeding device for moving the cans toward and under the port $5^b$.

17 designates tracks upon which the cans are guided toward their place under the port $5^b$.

The piston is operated by means of an arm 18 loose on a rock shaft 19, but this arm 18 has a spring and rod connection with a short arm $18^a$ secured on the shaft 19. These arms 18 and $18^a$ constitute a yielding or flexible lever. On the shaft 19 there is secured an arm 21 that reaches upward and is connected with the can-feeding device 16. Loose on the shaft 19 is a bell crank lever composed of a forked arm 20 and an arm 22 that reaches upward and engages a cross bar connecting the rods of the two valves 13. On the outer end of the shaft 19 is secured an arm 26 the extremity of which is made with a slot $26^a$ that is engaged by a crank pin $23^a$ on a crank arm 23 that is secured to the rotary operating shaft 11. The piston $12^a$ is therefore reciprocated by means of the arm 26 which rocks the shaft 19. The arms 18—$18^a$ and 21 are also operated by the arm 26 and shaft 19. The tangs or branches of the fork-arm 20 are provided with suitable antifriction rollers which are acted on by cams $11^a$ and $11^b$ to intermittently rock said fork arm and therefore correspondingly reciprocate the valves 13.

The stroke of the piston $12^a$, and therefore the quantity of corn fed into the can, is regulated by an adjustable set screw 18<sup>b</sup>, the flexible lever 18—18<sup>a</sup> permitting this. It is obvious that the screw 18<sup>b</sup> can be adjusted to vary the stroke of the piston while the machine is in operation.

In operation the valve 13 is moved to cover the upper end of the cylinder 12 when the piston 12<sup>b</sup> moves up and consequently when the piston moves in that direction the corn or other material is forced out of the cylinder through the cavity of 13<sup>a</sup> and into the can through the port 5<sup>b</sup>. When the piston 12<sup>a</sup> moves down the valve 13 is moved off the upper end of the cylinder and in its down stroke the piston is followed by a fresh supply of material from the chamber above and discharged in the same way as before into another can that has in the mean time been moved into position by the can-feeding device 16.

The cylinder 12 and piston therein, the valve 13 and the can-feeding device are preferably made and operated in pairs so that two cans can be filled at the same time. The shaft 11 is provided with an ordinary sliding clutch 24 and operating lever 24<sup>a</sup> therefor for applying at will the power to said shaft. The cylinder 12 is not necessarily circular in cross section, hence I do not limit myself to the geometrical meaning of that term. The forms of parts in other particulars can also be varied.

What I claim and desire to secure by Letters Patent is:

1. In a can filling machine, the combination with a vessel to contain the material to be supplied to cans, a discharge port therein, a can filling cylinder communicating with the supply vessel at the base thereof and lying below the point of communication therewith, a piston and its rod working in said cylinder but externally to said supply vessel, a valve constructed to slide over the end of the cylinder and open and close communication between the supply vessel and cylinder and to establish communication between the cylinder and discharge port when closing the communication between the supply vessel and cylinder.

2. In a can filling machine, the combination with a vessel to contain the material to be supplied to cans, a discharge port therein, a can filling cylinder communicating with said supply vessel, a piston and its rod working in said cylinder, and a rectilinearly reciprocating valve constructed to open and close communication between the supply vessel and cylinder and establish communication of the cylinder with the discharge port, the portion of the valve which cuts off the communication between the supply vessel and the cylinder also containing the duct for establishing communication between the cylinder and discharge port.

3. In a can filling machine, the combination with a vessel to contain the material to be supplied to cans, a discharge port therein, a can filling cylinder communicating with said supply vessel, a piston and its rod working in said cylinder, and a valve of plate form adapted to open and close communication between the supply vessel and cylinder and having a raised portion therein forming a duct to establish communication between the cylinder and discharge port when the valve is moved to close the communication between the supply vessel and cylinder.

4. In a can filling machine, the combination with a vessel to contain the material to be supplied to cans, a discharge port therein, a can filling cylinder communicating with the supply vessel at the base thereof and lying below the point of communication therewith, a piston and its rod working in said cylinder but externally to the supply vessel, a rectilinearly reciprocating valve constructed to open and close communication between the supply vessel and cylinder, the portion of the valve which cuts off the communication between the supply vessel and the cylinder being provided with a duct to establish communication between the cylinder and discharge port when communication between the vessel and cylinder is closed.

5. In a can filling machine, the combination with a vessel to contain the material to be supplied to cans, a cylinder communicating with said vessel, a piston in the cylinder, adjustable means for limiting the throw of the piston, a flexible lever for operating the piston, said flexible lever comprising two parts capable of oscillation independently of each other, and means in connection with the two parts for permitting one to yield with reference to the other.

In testimony whereof I affix my signature, in presence of two witnesses.

SAMUEL E. MORRAL.

Witnesses:
C. J. SCHULTZ,
H. A. De ROCHE.